US012521855B2

(12) United States Patent
Taylor et al.

(10) Patent No.: US 12,521,855 B2
(45) Date of Patent: Jan. 13, 2026

(54) FASTENER DRIVING TOOL HAVING A RETRACTABLE PROBE ASSEMBLY

(71) Applicant: Illinois Tool Works Inc., Glenview, IL (US)

(72) Inventors: Walter Taylor, McHenry, IL (US); Graeme Young, Cooks Beach (NZ)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/626,989

(22) Filed: Apr. 4, 2024

(65) Prior Publication Data

US 2024/0342887 A1 Oct. 17, 2024

Related U.S. Application Data

(60) Provisional application No. 63/496,087, filed on Apr. 14, 2023.

(51) Int. Cl.
*B25C 1/00* (2006.01)
*B25C 1/06* (2006.01)
*B25C 1/18* (2006.01)

(52) U.S. Cl.
CPC ................ *B25C 1/008* (2013.01); *B25C 1/06* (2013.01); *B25C 1/18* (2013.01)

(58) Field of Classification Search
CPC .. B25C 1/008; B25C 1/06; B25C 1/18; B25C 7/00
USPC ............................................................ 227/8
See application file for complete search history.

(56) References Cited

U.S. PATENT DOCUMENTS

| | | | | | |
|---|---|---|---|---|---|
| 4,721,170 | A * | 1/1988 | Rees | B25C 1/06 | 173/124 |
| 4,928,868 | A * | 5/1990 | Kerrigan | B25C 1/06 | 173/13 |
| 5,069,379 | A * | 12/1991 | Kerrigan | B25C 1/06 | 227/8 |
| 5,201,449 | A | 4/1993 | Miller | | |
| 5,238,167 | A * | 8/1993 | Howard | B25C 7/00 | 227/119 |
| 5,263,626 | A * | 11/1993 | Howard | B25C 1/08 | 227/8 |
| 5,452,835 | A * | 9/1995 | Shkolnikov | B25C 1/047 | 227/119 |
| 5,649,660 | A | 7/1997 | Akiba et al. | | |
| 6,695,192 | B1 | 2/2004 | Kwok | | |
| 6,808,101 | B2 | 10/2004 | Laubach et al. | | |

(Continued)

FOREIGN PATENT DOCUMENTS

EP 1894679 A2 3/2008

OTHER PUBLICATIONS

Extended European Search Report from European Application No. 24169566.7, dated Dec. 18, 2024 (7 pages).

*Primary Examiner* — Thomas M Wittenschlaeger
*Assistant Examiner* — Katie L Gerth
(74) *Attorney, Agent, or Firm* — Neal, Gerber & Eisenberg LLP

(57) ABSTRACT

A fastener driving tool including a retractable probe assembly that includes a probe configured to pivot, tensioned by a low-tension spring, and that includes additional probe movement slot that provides for additional movement of the probe, such that retractable probe assembly minimizes damage to the workpiece.

13 Claims, 13 Drawing Sheets

(56) References Cited

U.S. PATENT DOCUMENTS

| | | | | |
|---|---|---|---|---|
| 6,866,177 | B1 * | 3/2005 | Chen | B25C 1/008 227/8 |
| 6,959,850 | B2 | 11/2005 | Taylor et al. | |
| 6,964,362 | B2 | 11/2005 | Shkolnikov et al. | |
| 6,986,448 | B2 * | 1/2006 | Lat | B25C 1/00 227/124 |
| 7,213,732 | B2 * | 5/2007 | Schell | B25C 1/043 227/8 |
| 7,303,103 | B2 * | 12/2007 | Wang | B25C 1/047 227/8 |
| 7,318,546 | B2 * | 1/2008 | Segura | B25C 1/008 227/8 |
| 7,506,787 | B2 * | 3/2009 | Wu | B25C 1/008 227/8 |
| 7,628,304 | B2 * | 12/2009 | Yamamoto | B25C 7/00 227/119 |
| 7,757,920 | B2 | 7/2010 | Shea et al. | |
| 8,276,798 | B2 | 10/2012 | Moeller et al. | |
| 8,292,143 | B2 * | 10/2012 | Lee | B25C 1/008 227/8 |
| 8,631,986 | B2 * | 1/2014 | Hlinka | B25C 1/06 227/4 |
| 8,827,132 | B2 | 9/2014 | Mina et al. | |
| 9,114,516 | B2 * | 8/2015 | Porth | B25C 1/08 |
| 9,486,906 | B2 | 11/2016 | Zhao et al. | |
| 9,527,196 | B2 | 12/2016 | Segura | |
| 2005/0045688 | A1 * | 3/2005 | Chen | B25C 1/008 227/8 |
| 2006/0112580 | A1 * | 6/2006 | DeKeyser | G01N 3/42 33/626 |
| 2007/0215665 | A1 * | 9/2007 | Ohmori | B25C 1/08 227/119 |
| 2010/0308098 | A1 * | 12/2010 | Francis | B25C 1/047 227/148 |
| 2013/0299546 | A1 * | 11/2013 | Zhao | B25C 1/008 227/8 |

* cited by examiner

FASTENER DRIVING TOOL HAVING A RETRACTABLE PROBE ASSEMBLY

PRIORITY CLAIM

The application claims priority to and the benefit of U.S. Provisional Patent Application Ser. No. 63/496,087, filed Apr. 14, 2023, the entire contents of which are incorporated herein by reference.

BACKGROUND

The present disclosure relates to powered fastener driving tools. Powered fastener driving tools employ one of several different types of power sources to drive a fastener (such as a nail) into a workpiece (and into an underlying member to attach the workpiece to the underlying member). Various known powered fastener driving tools use a power source to drive a piston of the tool attached to a driver blade of the tool through a cylinder of the tool from a pre-firing position to a firing position. As the piston moves toward the firing position, the driver blade travels through a nosepiece assembly of the tool into contact with a fastener temporarily positioned in the nosepiece assembly. Continued movement of the piston to the firing position causes the driver blade to drive the fastener from the nosepiece assembly into the workpiece (and the underlying member). The piston is then forced back to the pre-firing position in a way that depends on the tool's configuration and the power source. A fastener-advancing device of the tool moves another fastener from a magazine of the tool into the nosepiece assembly such that the tool is ready to drive this next fastener.

Combustion powered fastener driving tools are one such type of powered fastener driving tool. A combustion powered fastener driving tool uses a small internal combustion assembly as its power source. For a conventional combustion powered fastener driving tool, when an operator engages a workpiece contact element ("WCE") of the nosepiece assembly of the tool against the workpiece, the WCE moves from an extended position to a retracted position. This movement of the WCE causes one or more mechanical linkages of the WCE to cause: (1) a valve sleeve of the tool to move to a sealed position to seal a combustion chamber of the tool that is in fluid communication with the cylinder; and (2) a fuel delivery system of the tool to dispense fuel from a removable fuel canister in the tool into the then sealed combustion chamber. Thereafter, when the operator then pulls the trigger of the tool, a trigger switch of the tool is actuated and causes a spark plug of the tool to generate a spark that ignites the fuel/air mixture in the combustion chamber. This generates high-pressure combustion gases that expand and force the piston to move through the cylinder from the pre-firing position to the firing position, thereby causing the driver blade to contact a fastener positioned in the nosepiece assembly and to drive the fastener from the nosepiece assembly into the workpiece and the underlying member (as described above). Just before the piston reaches the firing position, the piston passes exhaust check valves of the tool defined through the cylinder, and the combustion gases that propel the cylinder exhaust through the check valves to atmosphere. The combustion chamber remains sealed during this fastener driving process and thus a vacuum pressure above the piston is generated. The vacuum pressure at least in part causes the piston to return toward the pre-firing position. Various such tools include other features that facilitate the return of the piston to the pre-firing position. When the operator removes the WCE from engagement with the workpiece, a spring of the tool biases the WCE from the retracted position back to the extended position, causing the one of the mechanical linkages to move the valve sleeve to an unsealed position to unseal the combustion chamber.

Various known fastener driving tools include a WCE that includes a fixed locating probe at the end of the WCE. Various known fastener driving tools include a WCE that includes a pivotable locating probe at the end of the WCE. These fixed or pivotable locating probes can damage certain types of workpieces during the process of locating the probe at the desired position on the workpiece and during fastener driving process. Specifically, the fixed or pivotable locating probes can cause the area adjacent to the head of the fastener that is driven into the workpiece to be larger than then head of the fastener. This causes the workpiece to have a substantially less than desired aesthetic appearance.

There is a need for fastener driving tools that minimize such damage to workpieces.

SUMMARY

Various embodiments of the present disclosure provide a fastener driving tool including a WCE having a retractable probe assembly that minimizes damage to a workpiece in the area around and adjacent to the head of the fastener that is driven into the workpiece by the tool. In various embodiments, the retractable probe assembly includes a probe that is configured to slide forwardly and rearwardly relative to the WCE, that is configured to pivot relative to the WCE, that is tensioned by a low-tension spring, and that includes an elongated probe movement slot that provides for such slidable movement of the probe relative to the WCE. In various embodiments, the retractable probe assembly enables full retraction of the probe to a position that is aligned with the free end member of the WCE or that is rearward of the free end member of the WCE. In various embodiments, the fastener driving tool of the present disclosure is a combustion powered fastener driving tool including a nosepiece assembly with a retractable probe assembly. In various other embodiments, the fastener driving tool of the present disclosure is a pneumatically powered tool including a nosepiece assembly with a retractable probe assembly. In various other embodiments, the fastener driving tool of the present disclosure is an electrically powered tool (such as an electric battery powered tool) including a nosepiece assembly with a retractable probe assembly. In various other embodiments, the present disclosure relates to a nosepiece assembly with a retractable probe assembly for a fastener driving tool.

Additional features and advantages are described in, and will be apparent from, the following Detailed Description and the Figures.

DETAILED DESCRIPTION

Figure 1:
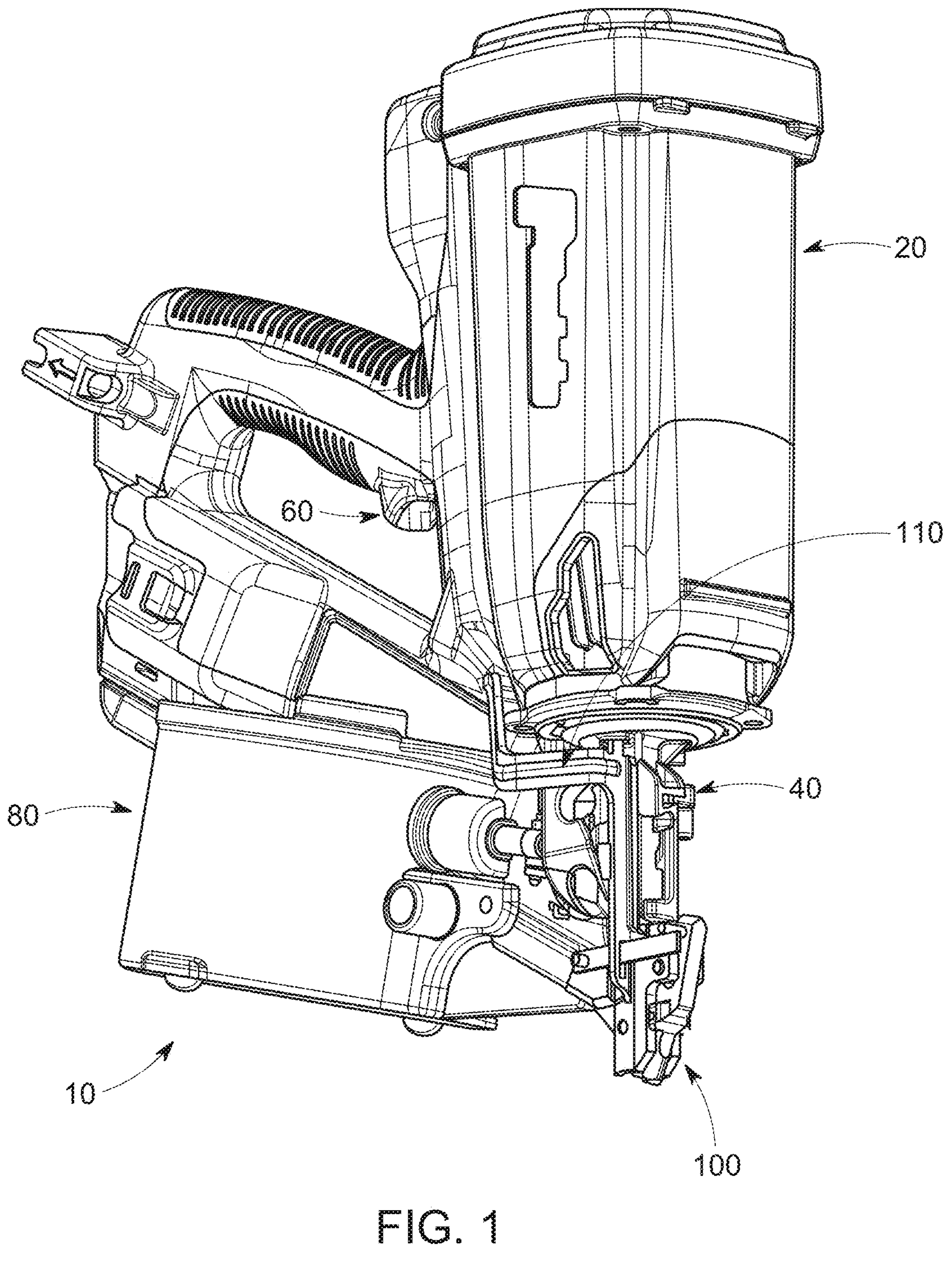
FIG. 1 is a front perspective view of a combustion powered fastener driving tool having a WCE with a retractable probe assembly in accordance with one example embodiment of the present disclosure.
Figure 2:
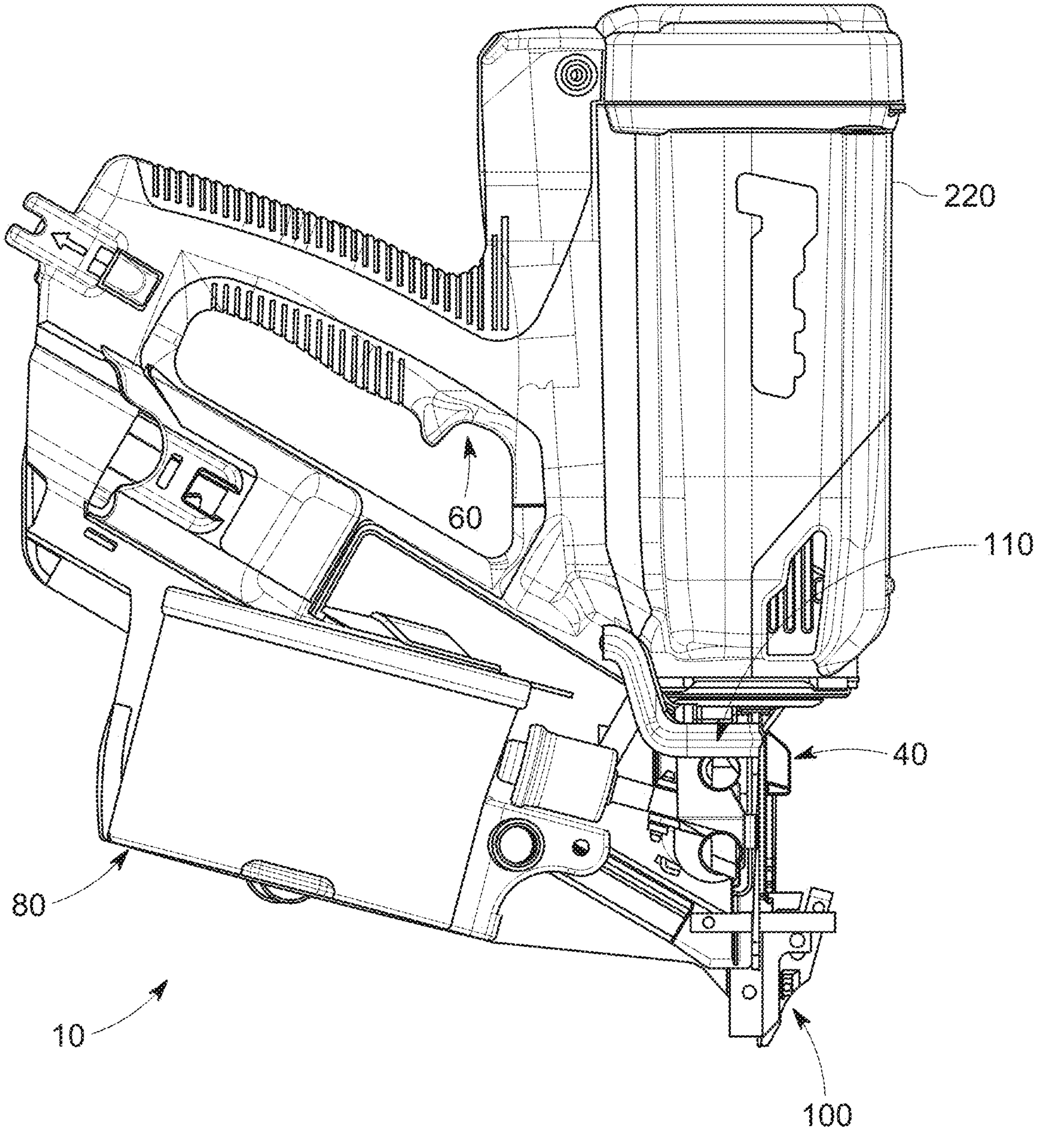
FIG. 2 is a right side view of the tool of FIG. 1.
Figure 3:
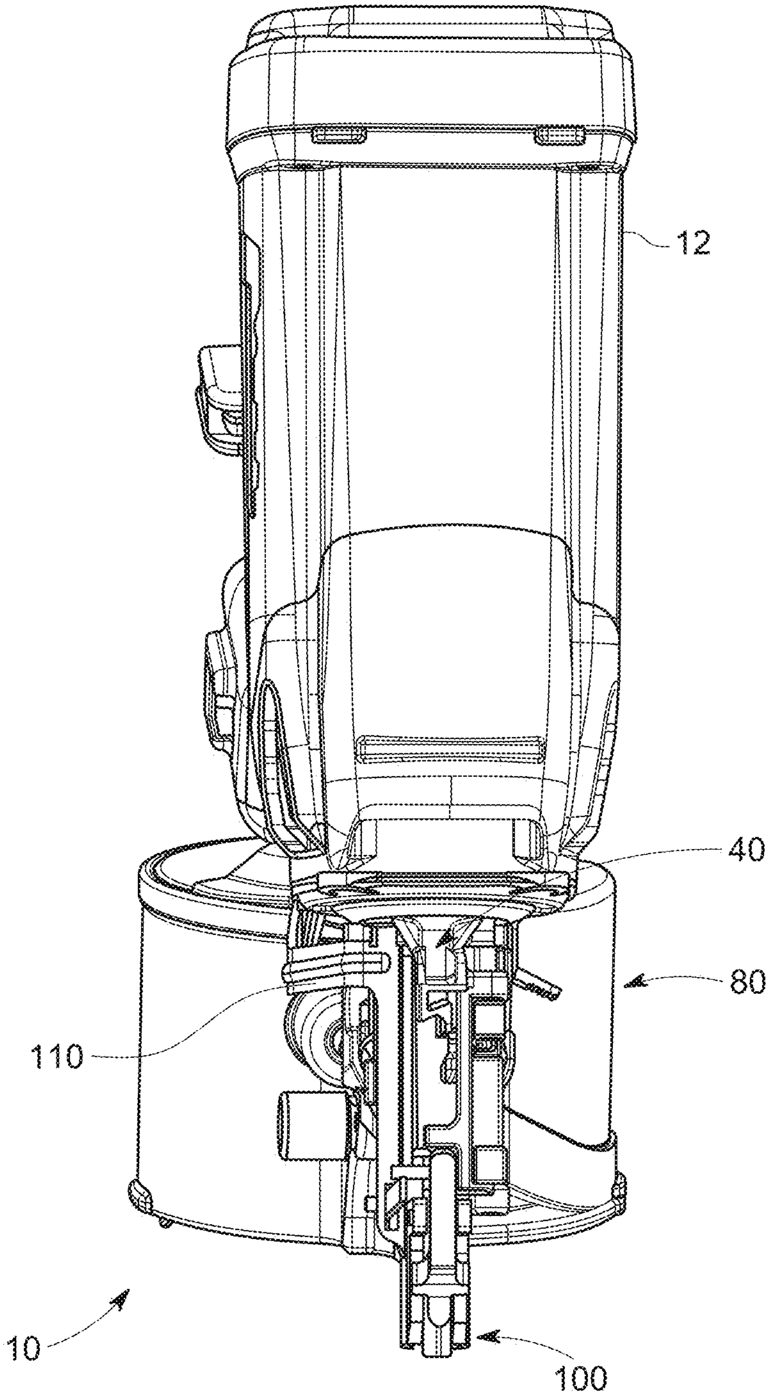
FIG. 3 is a front view of the tool of FIG. 1.
Figure 4:
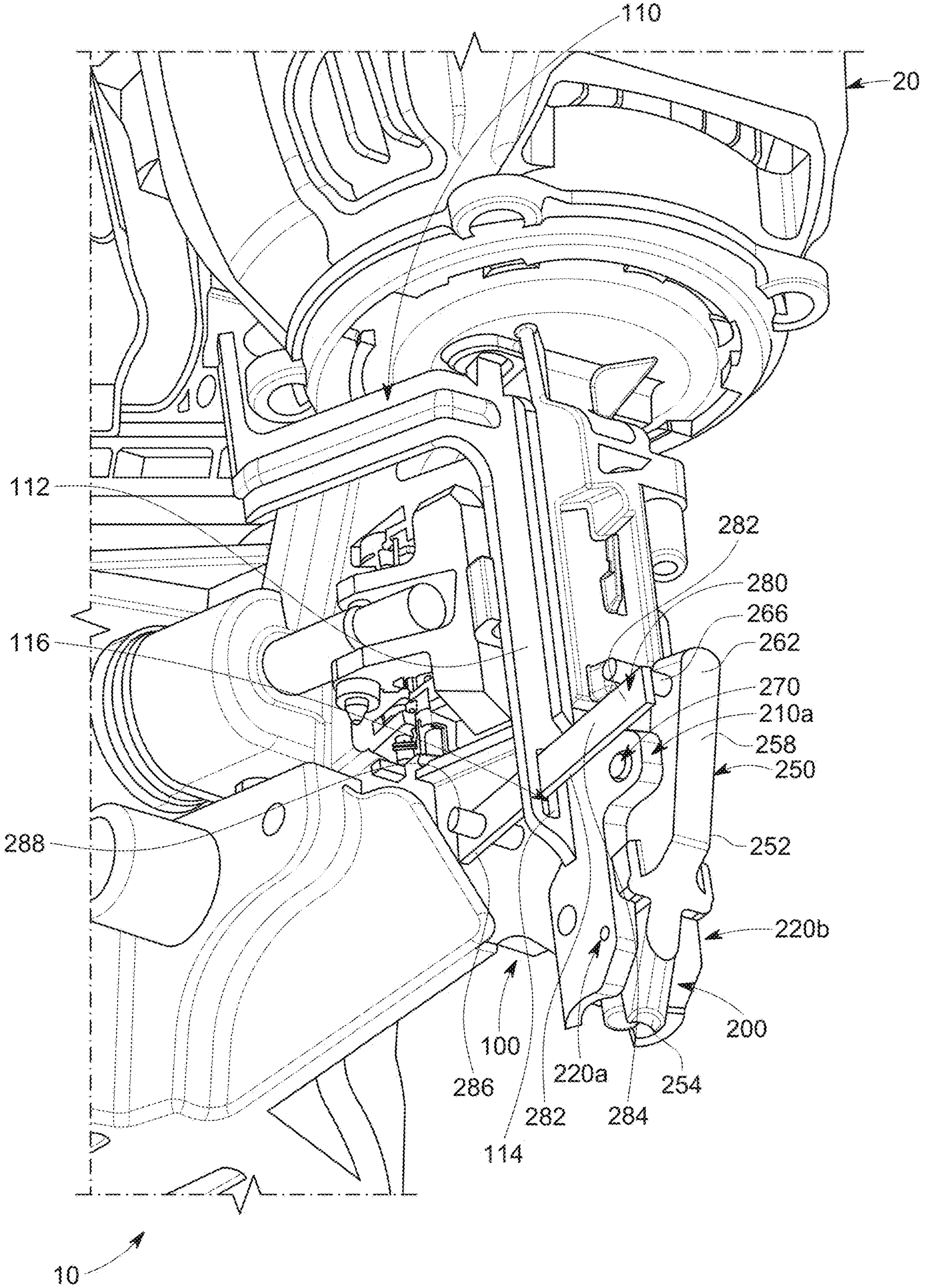
FIG. 4 is an enlarged fragmentary front perspective view of the WCE including the retractable probe assembly of the tool of FIG. 1.
Figure 5:
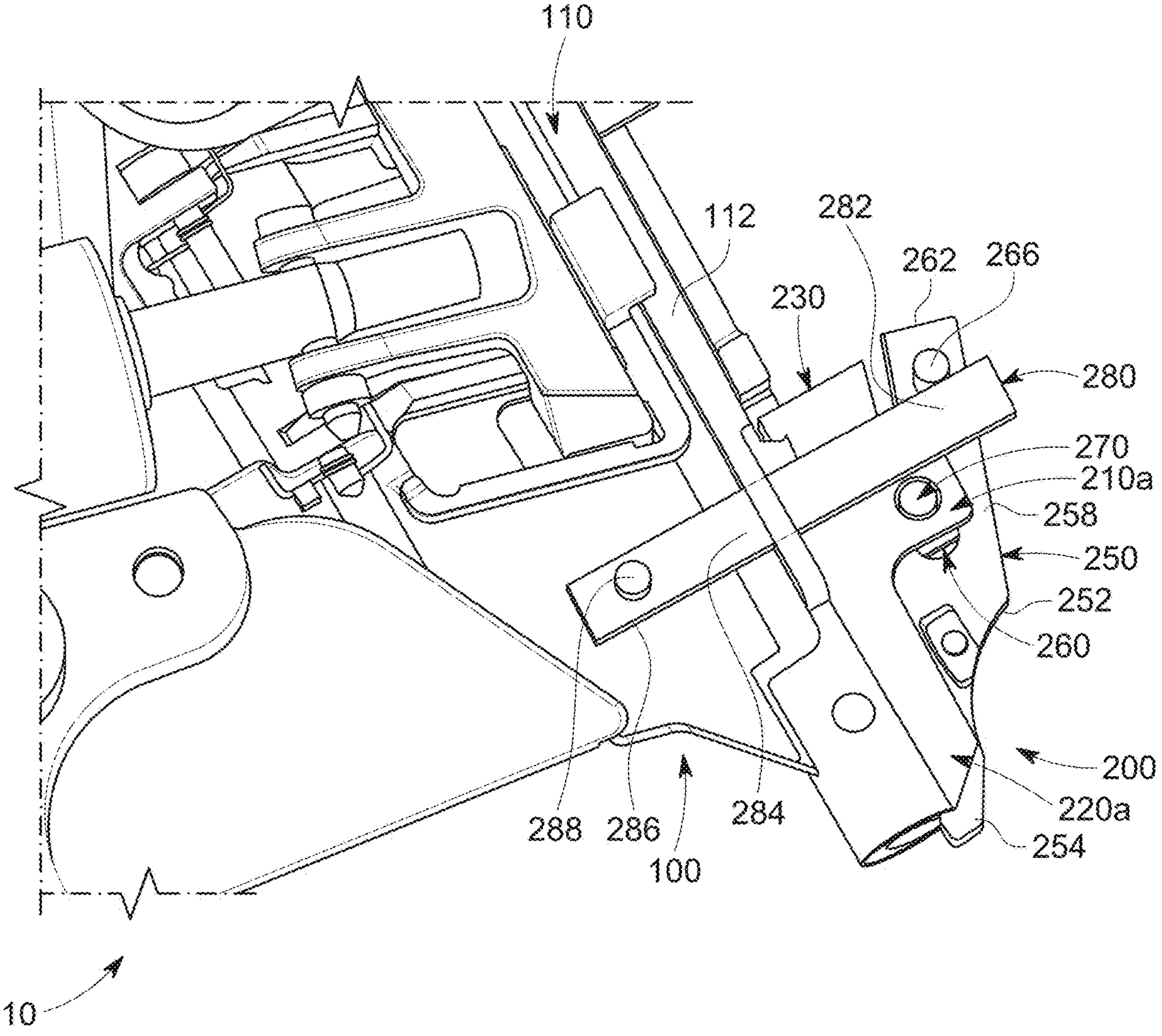
FIG. 5 is an enlarged fragmentary right side view of part of the WCE including the retractable probe assembly of the tool of FIG. 1.
Figure 6:
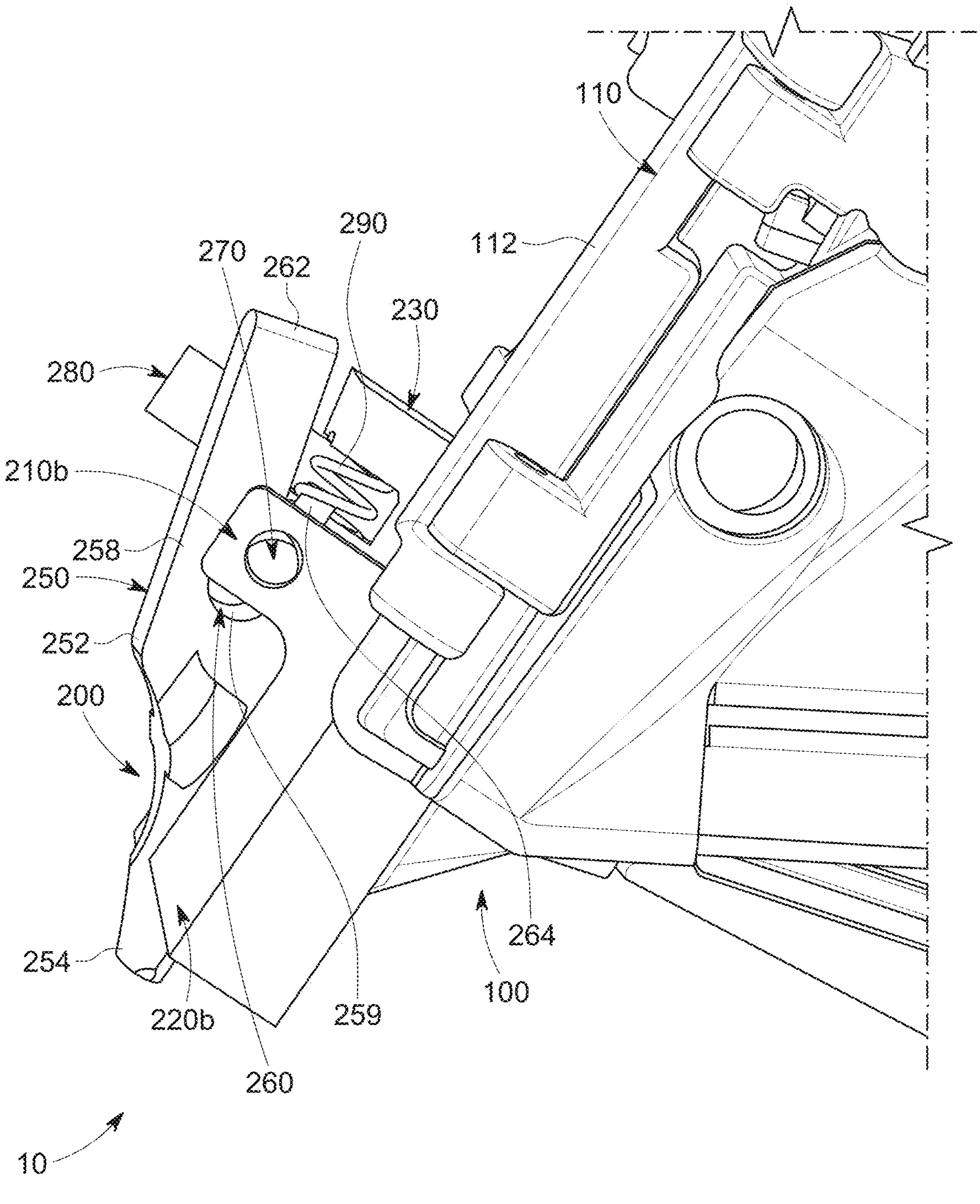
FIG. 6 is an enlarged fragmentary left side view of part of the WCE including the retractable probe assembly of the tool of FIG. 1.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1, 2, 3, 4, 5, and 6 illustrate a fastener driving tool 10 of one example embodiment of the present disclosure (which is sometimes called the "tool" for brevity). In this example embodiment, the tool 10 is a combustion powered fastener driving tool, but it should be appreciated that the tool may be a different type of fastener driving tool. In other words, the combustion powered fastener driving tool is used as the primary example herein for explaining the present disclosure, but it should be appreciated that the present disclosure is not limited to such powered fastener driving tools, and that the fastener driving tools of the present disclosure can be other types of fastener driving tools such as but not limited to pneumatically powered fastener driving tools or electrically powered fastener driving tools (such as electric battery powered fastener driving tools).

The fastener driving tool 10 generally includes a multi-piece housing 20, an internal combustion assembly (not shown) at least partially within the housing 20, a nosepiece assembly 40 connected to and supported by the housing 20, a trigger assembly 60 connected to and supported by the housing 20, and a fastener magazine 80 connected to and supported by the housing 20 and also connected to the nosepiece assembly 40. The nosepiece assembly 40 includes a WCE 100 and a retractable probe assembly 200 in accordance with one example embodiment of the present disclosure. Since various components of the fastener driving tool 10 such as the housing 20, internal combustion assembly (including the fuel delivery system), the trigger assembly 60, parts of the nosepiece assembly 40, parts of the WCE 100, and the fastener magazine 80 are well-known in the industry, they are only partially shown in the drawings and not described herein in detail for brevity.

The internal combustion assembly of the tool 10 generally includes: a cylinder (not shown) within and supported by the housing 20; a piston (not shown) slidably disposed within the cylinder; a driver blade (not shown) attached to and extending below the piston; a valve sleeve (not shown) within and supported by the housing 20. The valve sleeve partially surrounds the cylinder and is movable relative to the housing 20 between an unsealed position and a sealed position. When the valve sleeve is in the sealed position, the combustion chamber is sealed. When the valve sleeve is in the unsealed position, the combustion chamber is unsealed. The WCE 100 includes a linkage 110 connected at one end (not shown) that is positioned in the housing 20 to the valve sleeve. The linkage 110 includes an elongated member 112 that includes an inner somewhat oval inner surface 114 that defines a somewhat oval lever receiving slot 116 (as further discussed below). The WCE 100 is movable relative to the housing 20 between an extended position and a retracted position. A biasing element (not shown), such as a spring, biases the WCE 100 to the extended position. Movement of the WCE 100 from the extended position to the retracted position causes the valve sleeve (via the linkage 110) to move from the unsealed position to the sealed position, and vice-versa.

In this illustrated example embodiment, the retractable probe assembly 200 includes: (1) probe supports **210*a* and 210*b*; (2) probe guides 220*a* and 220*b*; (3) a probe spring support 230; (4) a probe 250; (5) a pivot pin 270; (6) a probe movement lever 280; and (6) a tensioning spring 290**.

More specifically, the probe 250 includes a body 252 and an anchor 266 extending from the body 252. The body 252 extends in a forward and rearward direction relative to the WCE 100 and specifically the linkage 110 of the WCE 100. The body 252 is also moveable in forward and rearward directions relative to the WCE 100 and specifically the linkage 110 of the WCE 100 as further discussed below. The body 252 includes: (a) a locator 254 at a first or forward section of the body 252; (b) a central pivot member 258 at a second or central section of the body 252; (c) an anchor member 262 at a third or rear section of the body 252; and (d) a spring engager 264 extending rearwardly from the central pivot member 258. In this example embodiment, the body 252 of the probe 250 is a single monolithically formed steel member; however, it should be appreciated that the body can be otherwise suitably configured and made of other suitable materials. In this example embodiment, the anchor 266 of the probe 250 is also single monolithically formed steel member; however, it should be appreciated that the anchor can be otherwise suitably configured and made of other suitable materials. The locator 254 of the body 252 of the probe 250 is configured to engage the workpiece and assist the operator of the tool 10 in locating the exact position that the operator wants to drive the fastener. In certain workpieces, the position will be at an indent or partially formed hole for the fastener. In this illustrated example embodiment, the locator 254 has a relatively flat end surface (not labeled) and an outer surface (not labeled) that is partially curved and partially straight. This configuration partially assist the operator in the tool location process. The central pivot member 258 of the body 252 of the probe 250 connects the locator 254 to the anchor member 262. The central pivot member 258 includes an inner oval surface 259 that defines an inner oval pivot slot 260 configured to receive the fixed pivot pin 270 as further discussed below. The inner oval surface 259 includes a forward end surface (not labeled) and a rearward end surface (not labeled). This elongated slot can be alternatively shaped, sized, and configured. The central pivot member 258 and the inner oval pivot slot 260 facilitate certain amounts of forward and rearward movement of the probe 250 relative to the fixed pivot pin 270. The anchor member 262 of the body 252 of the probe 250 extends outwardly at an angle from the central pivot member 262. The spring engager 264 of the body 252 of the probe 250 extends rearwardly from the central pivot member 258 and is configured to engage and be engaged by a forward end (not labeled) of the spring 290. The anchor 266 of the probe 250 is fixedly connected to and transversely extends from the anchor member 262 of the body 252 and is configured to engage and be engaged by the probe movement lever 280 as further discussed below.

The probe supports 210*a* and 210*b* are each fixedly connected to the linkage 110 of the WCE 110, and in this example embodiment, are steel members monolithically formed with the linkage 110; however, it should be appreciated that the probe supports 210*a* and 210*b* can be otherwise suitably configured and made of other suitable materials. The probe supports 210*a* and 210*b* are spaced-apart such that the central pivot member 258 of the body 252 of the probe 250 extends between the probe supports 210*a* and 210*b* and is pivotable relative to and slidable between the probe supports 210*a* and 210*b*. The probe supports 210*a* and 210*b* each include an inner cylindrical surface (not labeled) that defines a cylindrical pivot opening (not labeled) configured to receive the pivot pin 270 as further discussed below. The probe supports 210*a* and 210*b* pivotally and slidably support the probe 250 via the pivot pin 270. The probe guides 220*a* and 220*b* are each fixedly connected to the linkage 110 of the WCE 110. The probe guides 220*a* and 220*b* are each fixedly connected and extend forwardly of the probe supports 210*a* and 210*b*. The probe guides 220*a* and 220*b* in this example embodiment are steel members monolithically formed with the linkage 110 and the probe supports 210*a* and 210*b*; however, it should be appreciated that the probe guides 220*a* and 220*b* can be otherwise suitably configured and made of other suitable materials. The probe guides 220*a* and 220*b* are spaced-apart such that part of the central pivot member 258 of the body 252 of the probe 250 and part of the locator 254 of the body 252 of the probe 250 extends between the probe guides 220*a* and 220*b* and are slidable between the probe guides 220*a* and 220*b*. The probe guides 220*a* and 220*b* control and limit the lateral movement of the locator 254, the body 252, and the probe 250.

The probe spring support 230 is fixedly connected to the linkage 110 of the WCE 110 and extends outwardly therefrom. The probe spring support 230 in this example embodiment is a steel member monolithically formed with the linkage 110; however, it should be appreciated that the probe spring support 230 can be otherwise suitably configured and made of other suitable materials. The probe spring support 230 is configured to be engaged by and engage a rear end (not labeled) of the spring 290 to provide a base for the spring 290.

The pivot pin 270 is a cylindrical member that is made from steel in this example embodiment, however, it should be appreciated that the pivot pin 270 can be otherwise suitably configured and made of other suitable materials. The pivot pin 270 is configured to extend through the cylindrical pivot opening of the probe support 210*a*, the elongated pivot slot 260 of the central pivot member 258 of the body 252 of the probe 250, and the cylindrical pivot opening of the probe support 210*b* such that the central pivot member 258 and thus the probe 250 are: (1) pivotal relative to the probe supports 210*a* and 210*b*; and (2) forwardly and rearwardly slidable relative to the probe supports 210*a* and 210*b*. It should be appreciated that the configurations (such as the sizes) of the pivot pin 270 and the elongated pivot slot 260 determine the amount of pivoting and forward and rearward movement of the probe 250. The present disclosure contemplates that the amounts of such movements can be controlled by the varying the sizes of such components, in addition to the varying the amount of tension provided by the spring 290.

The probe movement lever 280 includes a body 282 and a pivot mount 288. The body 282 includes: (a) an anchor engaging section 282; (b) a linkage engaging section 284 that extends through the lever receiving slot 116 in the elongated member 112 of the linkage 110; and (c) the pivot section 286 connected to the pivot mount 288. In this example embodiment, the body 282 of the probe movement lever 280 is a single monolithically formed steel member; however, it should be appreciated that the body 282 can be otherwise suitably configured and made of other suitable materials. The pivot mount 288 is also a single monolithically formed steel member; however, it should be appreciated that the pivot mount 288 can be otherwise suitably configured and made of other suitable materials. The pivot mount 288 is fixedly connected to the pivot section 286 of the body 282 of the probe movement lever 280. The pivot mount 288 is freely pivotally connected to a fixed section (not labeled) of the nosepiece 100. Thus, the probe movement lever 280 is pivotally connected at one end to the fixed section of the nosepiece 100 such that when the elongated member 112 of the WCE 100 is retracted and moved toward the housing 20, the elongated member 112 that is coupled to the probe movement lever 280 causes the probe movement lever 280 to pivot rearwardly toward the housing 20. When the probe movement lever 280 pivots rearwardly toward the housing 20, the anchor engaging section 282 of the probe movement lever 280 that is coupled to the anchor 266 (and thus to the probe 250) causes the reward movement of the anchor 266 and thus the rearward movement of the probe 250 against the forward tension provided by the spring 290. This causes the full retraction of the probe 250 such that the free end of the probe 250 is aligned with the free end member of the WCE or such that the free end of the probe is rearward of the free end member of the WCE. At this point all of the engagement of the tool with the workpiece is on the free end member of the WCE and not on the probe 250. Thus, when the fastener is driven, the probe 250 is not in the hole and does not cause any damage to the area of the workpiece surrounding the hole.

The spring 290 is a single monolithically formed steel spring; however, it should be appreciated that the spring can be otherwise suitably configured and made of other suitable materials. The spring 290 provides a relatively low amount of forward directed tension such as 1/16 lbs. on the probe 250. It should be appreciated that the tension provided by the spring can vary based on the desired allowed forward and rearward movement of the probe 250.

One example fastener driving process employing the example tool 10 is now described.

To start a fastener driving process, the operator positions the tool 10 and specifically the locator 254 of the probe 250 at a specific location that the operator wants the fastener to be driven. For certain workpieces, this is in a location of the workpiece where an indent or partial hole is pre-formed for the fastener. The pivotable and slidable spring tensioned probe 250 including the locator 254 enables the operator to precisely position the probe 250 and thus the tool 10 before depressing (or significantly depressing) the WCE 200. At this point, the probe 250 has the ability to simultaneously pivot and move such as by sliding rearwardly or retracting slightly (via the pivot pin, the elongated slot, and the low-pressure tension spring configuration of the retractable probe assembly 200 described above). This in part prevents damage to workpiece and the area that defines the indent or hole in the workpiece at this initial positioning step.

When the positioning of the tool 10 and the locator 254 of the probe 250 is at the desired position, the operator can then further depress the tool 10 which causes the WCE 100 to move to its fully retracted position. This causes the elongated member 112 to pivot the probe movement lever 280 to rearwardly toward the housing 20. As the probe movement lever 280 pivots rearwardly toward the housing 20, the anchor engaging section 282 of the probe movement lever 280 (that is in engagement with the anchor 266 of the probe 250) causes the anchor 266 and the probe 250 to move or retract rearwardly toward the housing 20 against the tension of the spring 290 such that the pivot pin 270 engages the forward portion of the inner wall 259 that defines the elongated slot 260 in the probe 250. In this embodiment, this causes the locator 254 of the probe 250 to fully retract toward the housing 20. In this fully retracted position, the free end of the probe 250 is aligned with the free end member of the WCE or such that the free end of the probe is rearward of the free end member of the WCE. In such embodiments, the retractable probe assembly 200 facilitates complete removal of probe 250 from the hole thus eliminating any contact with the workpiece by the probe and transferring full pressure to forward end of the WCE 100.

The WCE 100 moving from its extended position to its retracted position also causes: (1) the valve sleeve to move (via the linkage 110) from the unsealed position to the sealed position to seal the combustion chamber; (2) a fuel canister in the tool to dispense fuel into the combustion chamber via the fuel delivery system; and (3) the valve sleeve to actuate a chamber switch.

The operator then pulls the trigger of the trigger assembly to actuate the trigger switch, which causes the spark plug to deliver a spark and ignite the fuel/air mixture in the combustion chamber. The fuel/air mixture explodes, thereby exerting pressure on the piston and forcing the piston and the attached driver blade to move from the pre-firing position to the firing position. This causes the driver blade to drive a fastener from the nosepiece assembly 40 into the workpiece and the underlying member. As this occurs, the retracted probe 250 of the retractable probe assembly 200 does not damage workpiece because it is fully out of the path of the fastener during the fastener driving process. The retractable probe assembly 200 thus enables retraction of the probe at an accelerated rate versus the rate of the tool fastener driving process for complete removal of probe 250 from the hole thus eliminating any contact with the workpiece while transferring full pressure to WCE.

Additionally, as the piston travels toward the firing position, the piston pushes air through the exhaust check valve and the vent hole. Once reaching the firing position, the piston impacts a bumper of the tool 10. With the piston beyond the exhaust check valve, high pressure gasses vent from the cylinder until near atmospheric pressure conditions are present and the check valve closes. Due to internal pressure differentials in the cylinder, a vacuum is created above the piston, which sucks the piston back to the pre-firing position, completing the fastener-driving cycle. The magazine 80 also loads another fastener into the nosepiece assembly 40, and the operator can repeat the process.

Thus, the retractable probe assembly 200 provides a substantial improvement over existing fastener driving tools with known locating probes that provide hole location only but that do not provide substantial pressure relief, and thus often lead to damage to the workpiece that absorbs the full pressure of the tool actuation stroke causing a chisel like unwanted result while forcing the probe into the workpiece causing lost drive energy as well.

Figure 7:
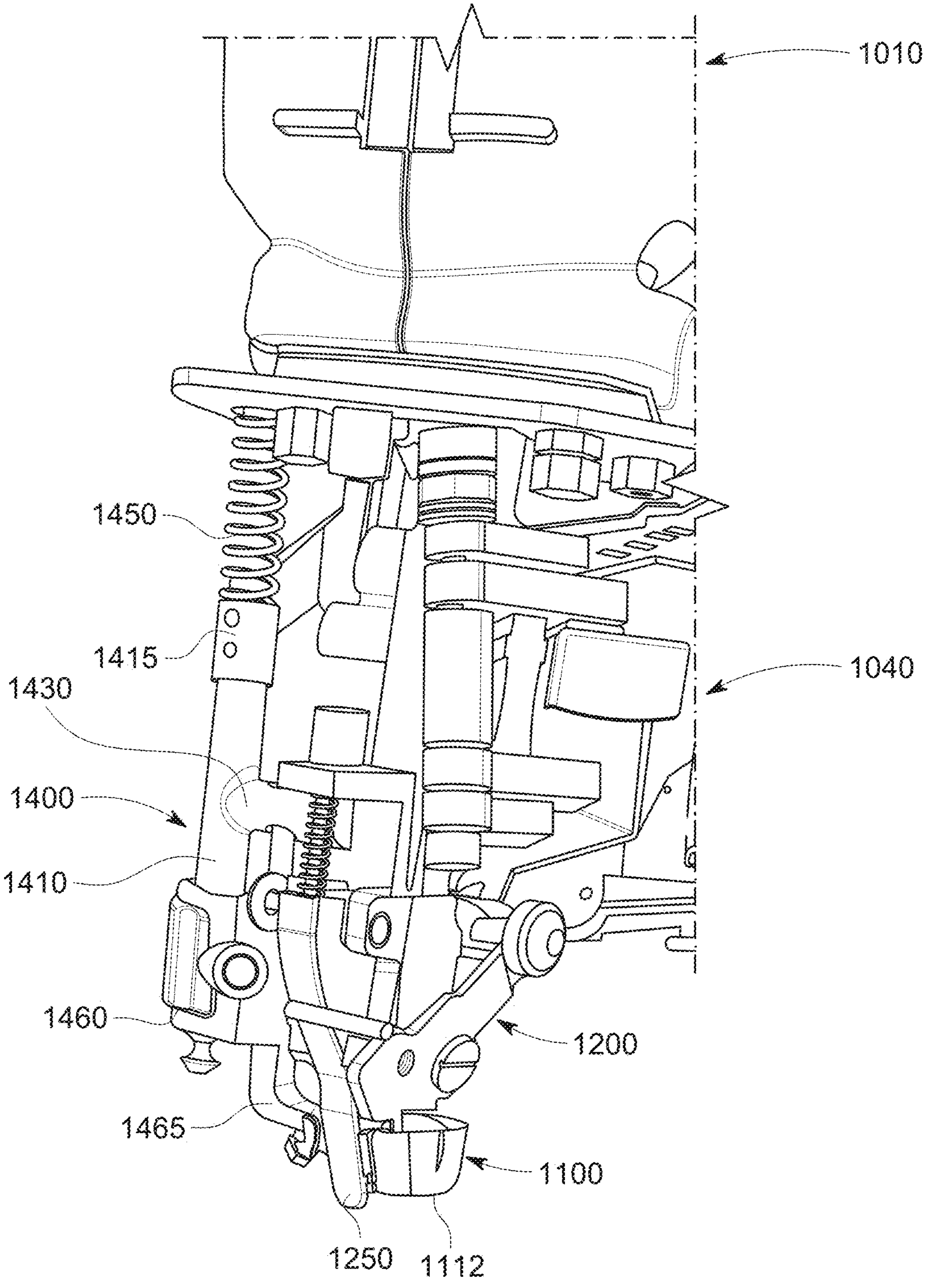
FIG. 7 is an enlarged fragmentary front side perspective view of part of the WCE including the retractable probe assembly of a fastener driving tool in accordance with another example embodiment of the present disclosure, and showing the WCE in a resting position.
Figure 8:
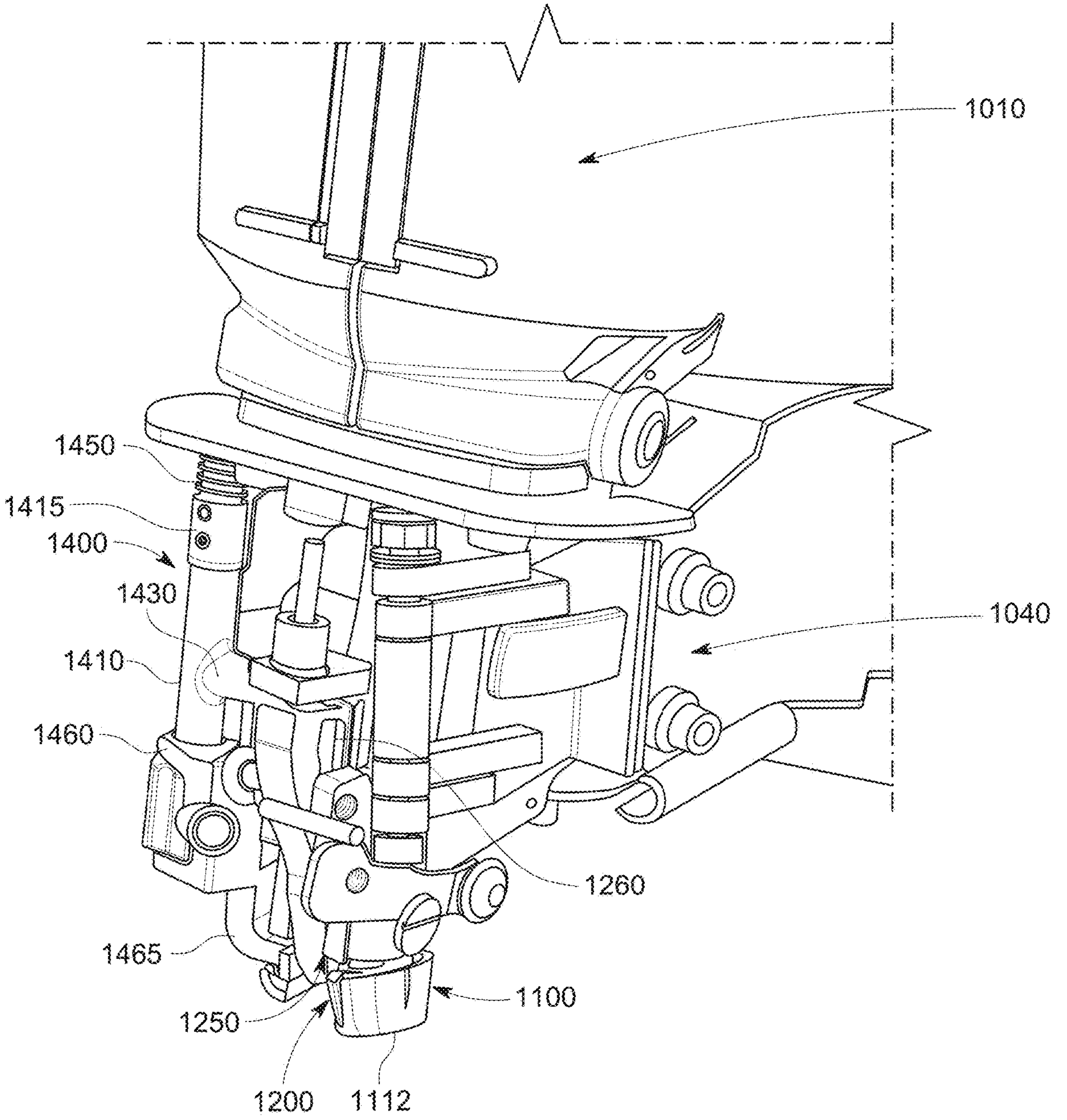
FIG. 8 is an enlarged fragmentary front side perspective view of part of the WCE including the retractable probe assembly of the tool of FIG. 7, and showing the WCE in retracted position.

FIGS. 7 and 8 illustrate part of a fastener driving tool 1010 of another example embodiment of the present disclosure. This example fastener driving tool 1010 generally includes various components of a fastener driving tool such as but not limited to the components described above or other suitable components that are not described herein for brevity. In this example, the nosepiece assembly 1040 of the tool 1010 includes a WCE 1100 and a retractable probe assembly 1200.

In this illustrated example embodiment, the retractable probe assembly 1200 includes: (1) probe supports (not labeled); (2) the probe guides (not labeled); (3) the probe spring support (not labeled); (4) the probe 1250; (5) the pivot pin (not labeled); (6) the probe movement lever (not labeled); and (6) the tensioning spring (not labeled), that are each somewhat alternatively configured and positioned, but perform the same overall functions as described above. More specifically, the probe 1250 includes a body (not labeled) and an anchor (not labeled) extending from the body. The body extends in a forward and rearward direction relative to the WCE 1100 and specifically the linkage (not labeled) of the WCE 1100. The body is also moveable in forward and rearward directions relative to the WCE 1100 and specifically the linkage of the WCE 1100. The body includes: (a) a locator (not labeled) at a first or forward section of the body; (b) a central pivot member (not labeled) at a second or central section of the body; and (c) a spring engager (not labeled) extending rearwardly from the central pivot member. In this example embodiment, the body of the probe is a single monolithically formed steel member; however, it should be appreciated that the body can be otherwise suitably configured and made of other suitable materials. The locator of the body of the probe 1250 is configured to engage the workpiece and assist the operator of the tool 1010 in locating the exact position that the operator wants to drive the fastener. The central pivot member includes an inner (oval) surface (not labeled) that defines an inner (oval) pivot slot 1260 configured to receive the fixed pivot pin (not labeled). This elongated slot can be alternatively shaped, sized, and configured. The inner oval surface includes a forward end surface (not labeled) and a rearward end surface (not labeled). The central pivot member and the inner oval pivot slot 1260 facilitate certain amounts of forward and rearward movement of the probe 1250 relative to the fixed pivot pin. The spring engager of the body of the probe 1250 extends rearwardly from the central pivot member and is configured to engage and be engaged by a forward end (not labeled) of the spring (not labeled). The anchor of the probe 1250 is fixedly connected to and transversely extends from the body and is configured to engage and be engaged by the probe movement lever (not labeled). The anchor engages the probe movement lever in a somewhat different configuration than as described above. Thus, the probe movement lever is pivotally connected at one end to a fixed section of the nosepiece 1040 such that when a member of the WCE 1100 is retracted and moved toward the housing, the member that is coupled to the probe movement lever causes the probe movement lever to pivot rearwardly toward the housing. When the probe movement lever pivots rearwardly toward the housing, the anchor engaging section of the probe movement lever that is coupled to the anchor (and thus to the probe 1250) causes the reward movement of the anchor and thus the rearward movement of the probe 1250 against the forward tension provided by the spring. This causes the full retraction of the probe 1250 such that the free end of the probe 1250 is aligned with the free end member 1112 of the WCE or such that the free end of the probe is rearward of the free end member 1112 of the WCE. At this point all of the engagement of the tool with the workpiece is on the free end member 1112 of the WCE and not on the probe 1250. Thus, when the fastener is driven, the probe 1250 is not in the hole and does not cause any damage to the area of the workpiece surrounding the hole.

This example embodiment additionally includes a depth adjuster 1400 for the free end member 1112 of the WCE 1100 that can be employed to adjust the relative positions of the probe 1250 and the free end member 1112 of the WCE 1100, and thus the depth that the probe 1250 can extend into a hole. The depth adjuster 1400 includes a leg 1410 connected by an adjustment assembly 1460 to an extension arm 1465 that is connected to the free end member 1112 of the WCE 1100. The depth adjuster 1400 includes a second arm 1430 connected to the leg 1410 and the WCE 3100 such that it moves the leg 1410 when the WCE 3100 moves. The depth adjuster 1400 includes a sleeve 1415 that guides the leg 1410 as it moves with the WCE 1100 toward and away from the housing of the tool 3010. The connection end (not labeled) of the sleeve 1415 is fixedly connected to the housing or a stationary member of the nosepiece. The depth adjuster 1400 includes a spring 1450 configured to engage the leg 1410 to bias the leg 1410 away from the housing (i.e., in a forward direction). The adjustment assembly 1460 is configured to adjust the forward and rearward position of the extension arm 1465 and thus the free end member 1112 of the WCE 1100 such that the free end member 1112 of the WCE 1100 can be at different forward and rearward positions relative to the rest of the WCR 1100 and thus relative to the probe assembly 1200 and the probe 1250 thereof. This enables the operator to select how far the probe 1250 extends beyond the free end member 1112 of the WCE 1100 and thus how far the probe 1250 can extend into the hole relative to the free end member 1112 of the WCE 1100.

Figure 9:
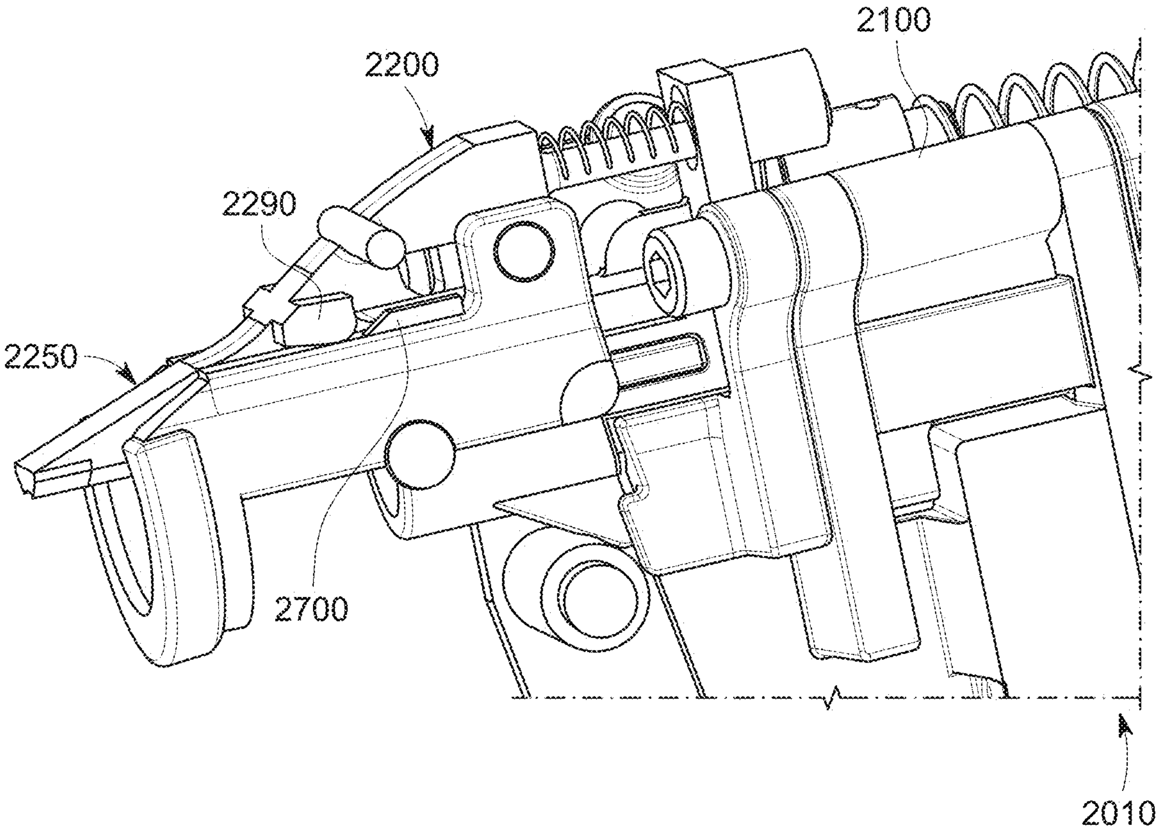
FIG. 9 is an enlarged fragmentary front side perspective view of part of the WCE including the retractable probe assembly of a fastener driving tool in accordance with another example embodiment of the present disclosure.
Figure 10:
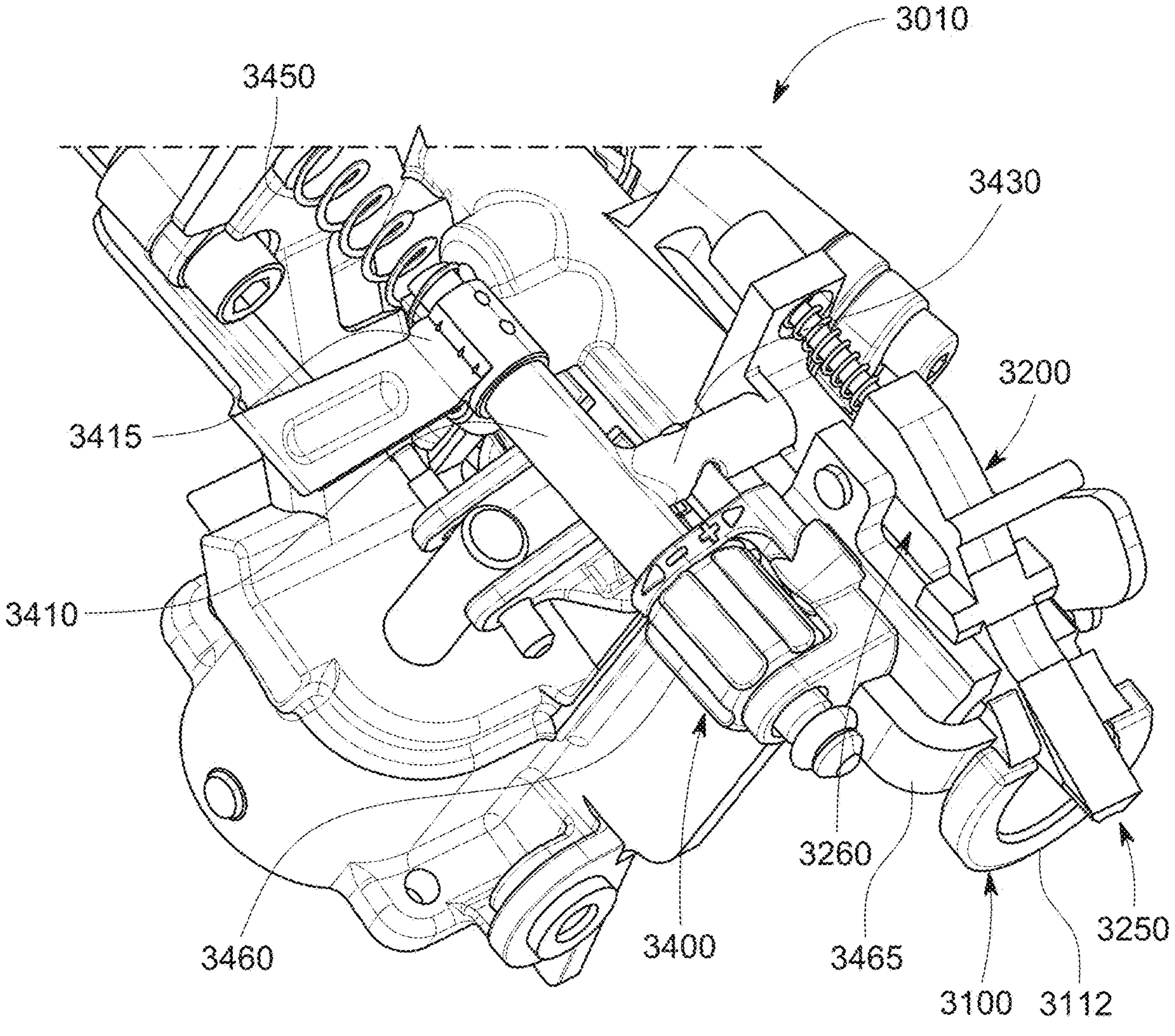
FIG. 10 is an enlarged fragmentary front side perspective view of part of the WCE including the retractable probe assembly of a fastener driving tool in accordance with another example embodiment of the present disclosure.
Figure 11:
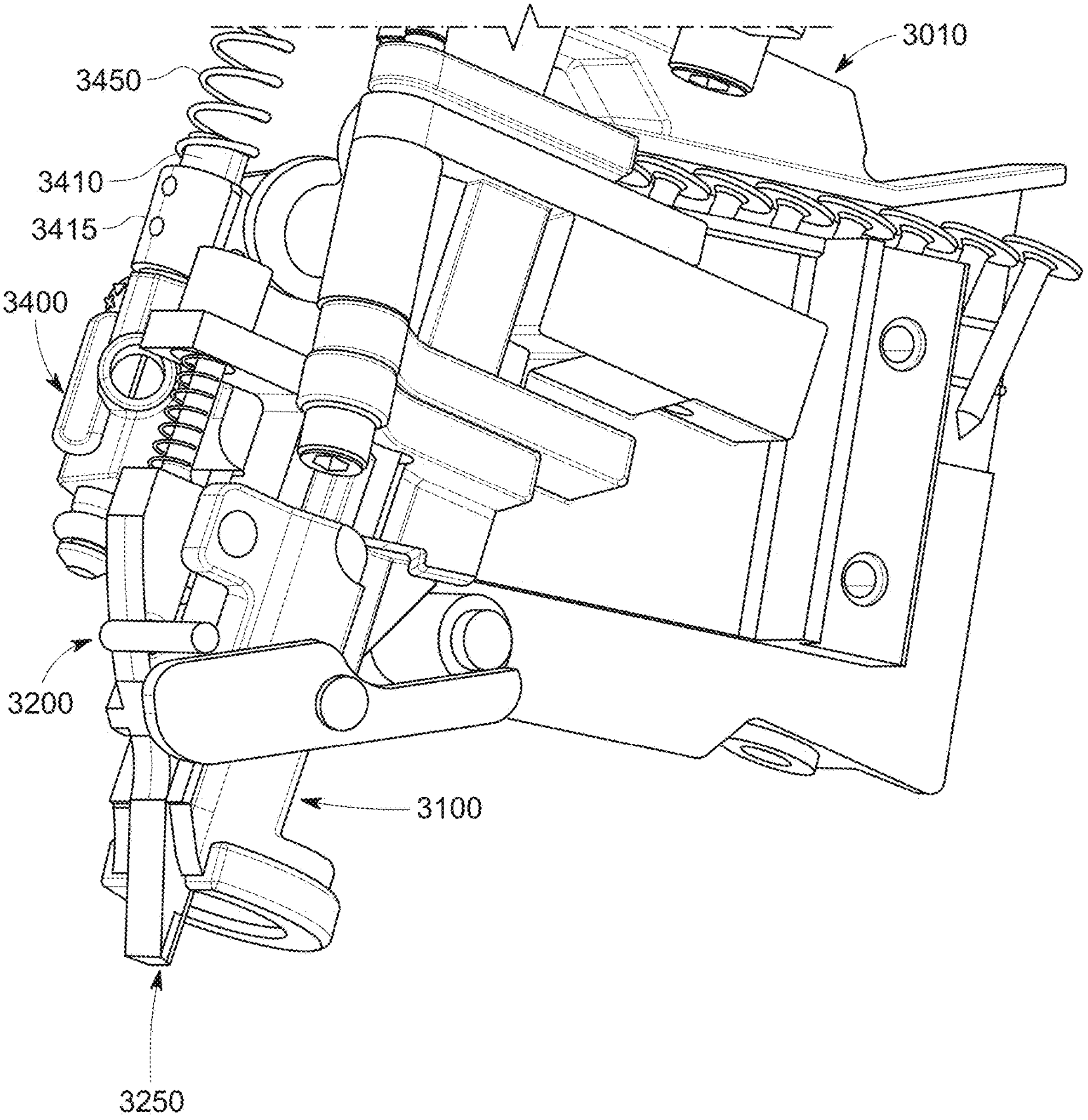
FIG. 11 is an enlarged fragmentary front side perspective view of part of the WCE including the retractable probe assembly of the tool of FIG. 10.
Figure 12:
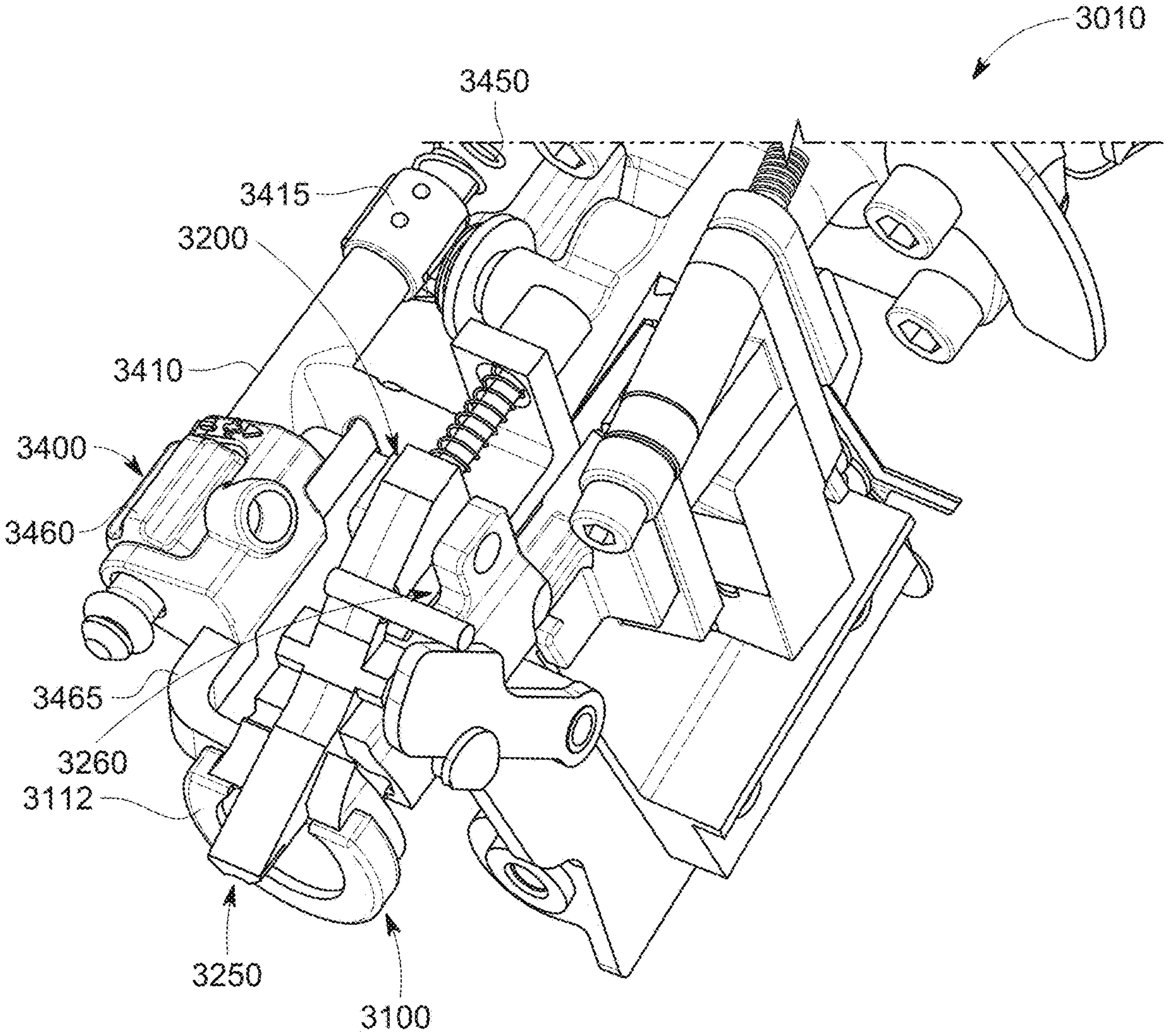
FIG. 12 is an enlarged fragmentary front side perspective view of part of the WCE including the retractable probe assembly of the tool of FIG. 10.
Figure 13:
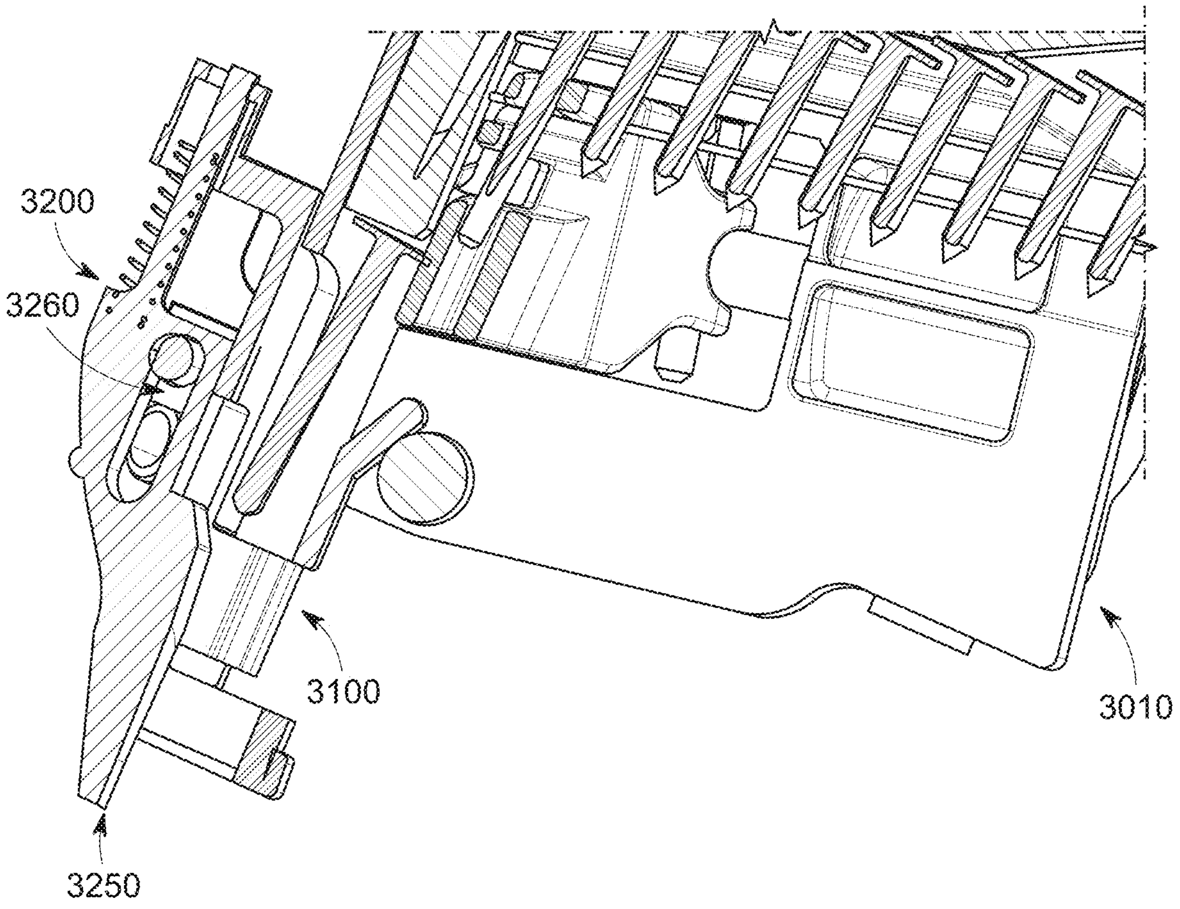
FIG. 13 is an enlarged fragmentary cross-sectional view of part of the WCE including part of the retractable probe assembly of the tool of FIG. 10.

FIG. 9 illustrates part of a fastener driving tool 2010 of another example embodiment of the present disclosure. This example fastener driving tool 2010 generally includes various components of a fastener driving tool such as but not limited to the components described above or other suitable components that are not described herein for brevity. In this example, the nosepiece assembly 2040 of the tool 2010 includes a WCE 2100 and a retractable probe assembly 2200. In this illustrated example embodiment, the retractable probe assembly 2200 includes: (1) probe supports (not labeled); (2) probe guides (not labeled); (3) the probe spring support (not labeled); (4) the probe 2250; (5) the pivot pin (not labeled); (6) the probe movement lever (not labeled); and (6) the tensioning spring (not labeled), that are each somewhat alternatively configured and positioned, but perform the same overall functions as described above. In this example embodiment, the probe 2250 includes a ramp engager 2290 configured to engage a ramp 2700 connected to and outwardly extending from one of the probe guides. When the body of the probe 2250 moves rearwardly, the ramp engager 2290 engages the ramp 2700 to cause the probe 2250 to move outwardly. This further outward movement of the probe 2250 causes the probe 2250 to further disengage from the surfaces that define the hole in the substrate and out of the path of the fastener being driven into the hole.

FIGS. 10, 11, 12, and 13 illustrate part of a fastener driving tool 3010 of another example embodiment of the present disclosure. This example fastener driving tool 3010 generally includes various components of a fastener driving tool such as but not limited to the components described above or other suitable components that are not described herein for brevity. In this example, the nosepiece assembly 3040 of the tool 3010 includes a WCE 3100 and a retractable probe assembly 3200.

In this illustrated example embodiment, the retractable probe assembly 3200 includes: (1) probe supports (not labeled); (2) probe guides (not labeled); (3) a probe spring support (not labeled); (4) a probe 3250; (5) a pivot pin (not labeled); (6) a probe movement lever (not labeled); and (7) a tensioning spring (not labeled), that are each somewhat alternatively configured and positioned, but perform the same overall functions as described above. More specifically, the probe 3250 includes a body (not labeled) and an anchor (not labeled) extending from the body. The body extends in a forward and rearward direction relative to the WCE 3100 (and specifically the linkage (not labeled) of the WCE 3100). The body is also moveable in forward and rearward directions relative to the housing (not labeled) and the WCE 3100 (and specifically the linkage of the WCE 3100). The body includes: (a) a locator (not labeled) at a first or forward section of the body; (b) a central pivot member (not labeled) at a second or central section of the body; and (c) a spring engager (not labeled) extending rearwardly from the central pivot member. In this example embodiment, the body of the probe is a single monolithically formed steel member; however, it should be appreciated that the body can be otherwise suitably configured and made of other suitable materials. The locator of the body of the probe 3250 is configured to engage the workpiece and assist the operator of the tool 3010 in locating the exact position that the operator wants to drive the fastener. The central pivot member includes an inner oval surface (not labeled) that defines an inner oval pivot slot 3260 configured to receive the fixed pivot pin (not labeled). The inner oval surface includes a forward end surface (not labeled) and a rearward end surface (not labeled). The central pivot member and the inner oval pivot slot 3260 facilitate certain amounts of forward and rearward movement of the probe 3250 relative to the fixed pivot pin. The spring engager of the body of the probe 3250 extends rearwardly from the central pivot member and is configured to engage and be engaged by a spring (not labeled). The anchor of the probe 3250 is fixedly connected to and transversely extends from the body and is configured to engage and be engaged by the probe movement lever (not labeled). The anchor engages the probe movement lever in a somewhat different configuration than as described above with respect to the first embodiment. Thus, the probe movement lever is pivotally connected at one end to a fixed section of the nosepiece 3040 such that when a member of the WCE 3100 is retracted and moved toward the housing, the member of the WCE 3100 that is coupled to the probe movement lever causes the probe movement lever to pivot rearwardly toward the housing. When the probe movement lever pivots rearwardly toward the housing, the anchor engaging section of the probe movement lever that is coupled to the anchor (and thus to the probe 3250) causes the reward movement of the anchor and thus the rearward movement of the probe 3250 against the forward tension provided by the spring. This causes the full retraction of the probe 3250 such that the free end of the probe 3250 is aligned with the free end member 3112 of the WCE 3100 or such that the free end of the probe is rearward of the free end member 3112 of the WCE 3100. At this point, all of the engagement of the tool 3010 with the workpiece is on the free end member 3112 of the WCE 3100 and not on the probe 3250. Thus, when the fastener is driven, the probe 3250 is not in the hole and does not cause any damage to the area of the workpiece surrounding the hole.

This example embodiment additionally includes a depth adjuster 3400 for the free end member 3112 of the WCE 3100 that can be employed to adjust the relative positions of the probe 3250 and the free end member 3112 of the WCE 3100, and thus the depth that the probe 3250 can extend into a hole. The depth adjuster 3400 includes a leg 3410 connected by an adjustment assembly 3460 to an extension arm 3465 that is connected to the free end member 3112 of the WCE 3100. The depth adjuster 3400 includes a second arm 3430 connected to the leg 3410 and leg 3410 move when the WCE 3100 moves. The depth adjuster 3400 includes a sleeve 3415 that guides the leg 3410 as it moves with the WCE 3100 toward and away from the housing of the tool 3010. The connection end (not labeled) of the sleeve 3415 is fixedly connected to the housing or a stationary member of the nosepiece. The depth adjuster 3400 includes a spring 3450 configured to engage the leg 3410 to bias the leg 3410 away from the housing (i.e., in a forward direction). The adjustment assembly 3460 is configured to adjust the forward and rearward position of the extension arm 3465 and thus the free end member 3112 of the WCE 3100 such that the free end member 3112 of the WCE 3100 can be at different forward and rearward positions relative to the rest of the WCR 3100 and thus relative to the probe assembly 3200 and the probe 3250 thereof. This enables the operator to select how far the probe 3250 extends beyond the free end member 3122 of the WCE 3100 and thus how far the probe 3250 can extend into the hole relative to the free end member 3122 of the WCE 3100.

Various modifications to the above-described embodiments will be apparent to those skilled in the art. These modifications can be made without departing from the spirit and scope of this present subject matter and without diminishing its intended advantages. Not all of the depicted components described in this disclosure may be required, and some implementations may include additional, different, or fewer components as compared to those described herein. Variations in the arrangement and type of the components; the shapes, sizes, and materials of the components; and the manners of attachment and connections of the components may be made without departing from the spirit or scope of the claims set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A fastener driving tool comprising
- a housing; and
- a nosepiece assembly connected to and supported by the housing, the nosepiece assembly including a workpiece contact element and a retractable probe assembly, the retractable probe assembly including:
  - a spring,
  - a probe tensioned away from the housing by the spring, wherein the probe defines a pivot slot configured to receive a pivot pin that enables the probe to move toward the housing and away from the housing,
  - spaced-apart probe supports that movably support the probe, and
  - a probe movement lever pivotally connected to a stationary member of the nosepiece assembly, coupled to the workpiece contact element, and coupled to the probe such that movement of the workpiece contact element toward the housing causes the probe movement lever to move the probe toward the housing against tension of the spring.

2. The fastener driving tool of claim 1, where the retractable probe assembly includes spaced-apart probe guides positioned to guide forward and rearward movements of the probe.

3. The fastener driving tool of claim 1, where the retractable probe assembly includes a probe spring support connected to the workpiece contact element.

4. The fastener driving tool of claim 1, where the spaced-apart probe supports pivotally and slidable support the probe.

5. The fastener driving tool of claim 1, wherein the probe includes an inner oval surface that defines the pivot slot.

6. A fastener driving tool comprising
- a housing; and
- a nosepiece assembly connected to and supported by the housing, the nosepiece assembly including a workpiece contact element and a retractable probe assembly, the retractable probe assembly including:
  - a spring,
  - a probe spring support connected to the workpiece contact element,
  - a probe tensioned away from the housing by the spring, wherein the probe defines a pivot slot configured to receive a pivot pin that enables the probe to move toward the housing and away from the housing,
  - spaced-apart probe supports connected to the workpiece contact element and that pivotally and slidably support the probe,
  - spaced-apart probe guides connected to the workpiece contact element and positioned to guide movements of the probe toward and away from the housing, and
  - a probe movement lever pivotally connected to a stationary member of the nosepiece assembly, coupled to the workpiece contact element, and coupled to the probe such that movement of the workpiece contact element toward the housing causes the probe movement lever to move the probe toward the housing against tension of the spring.

7. The fastener driving tool of claim 6, wherein the probe includes a body and an anchor transversely extending from the body.

8. The fastener driving tool of claim 7, wherein the body of the probe includes a locator, a central pivot member, and an anchor member, wherein the central pivot member is pivotally and slidably supported by the pivot pin, and wherein the pivot pin is supported by the spaced-apart probe supports.

9. The fastener driving tool of claim 8, wherein the body of the probe includes a spring engager extending from the central pivot member.

10. The fastener driving tool of claim 8, wherein the central pivot member of the body of the probe includes an inner oval surface that defines the pivot slot.

11. The fastener driving tool of claim 6, wherein the probe movement lever includes a body and a pivot mount pivotally connected to the stationary member of the nosepiece assembly.

12. The fastener driving tool of claim 11, wherein the body of the probe movement lever includes an anchor engaging section, a linkage engaging section that extends through a lever receiving slot in an elongated member of the linkage, and a pivot section connected to the pivot mount.

13. A fastener driving tool comprising a housing; and a nosepiece assembly connected to and supported by the housing, the nosepiece assembly including a workpiece contact element and a retractable probe assembly, the retractable probe assembly including:

a spring, a probe spring support connected to the workpiece contact element, a probe tensioned away from the housing by the spring, spaced-apart probe supports connected to the workpiece contact element and that pivotally and slidably support the probe, spaced-apart probe guides connected to the workpiece contact element and positioned to guide movements of the probe toward and away from the housing, and a probe movement lever including a body and a pivot mount pivotally connected to a stationary member of the nosepiece assembly, wherein the probe movement lever is coupled to the workpiece contact element and coupled to the probe such that movement of the workpiece contact element toward the housing causes the probe movement lever to move the probe toward the housing against tension of the spring, and wherein the body of the probe movement lever includes an anchor engaging section, a linkage engaging section that extends through a lever receiving slot in an elongated member of the linkage, and a pivot section connected to the pivot mount.

* * * * *